US007516758B2

(12) United States Patent
Huynh et al.

(10) Patent No.: US 7,516,758 B2
(45) Date of Patent: Apr. 14, 2009

(54) SPOOL-TYPE MANUAL VALVE WITH POSITION-ADJUSTABLE LEVER

(75) Inventors: Tam C. Huynh, Richfield, MN (US); Nathan H. French, Prior Lake, MN (US)

(73) Assignee: Eaton Corporation, Cleveland, OH (US)

( * ) Notice: Subject to any disclaimer, the term of this patent is extended or adjusted under 35 U.S.C. 154(b) by 362 days.

(21) Appl. No.: 11/397,217

(22) Filed: Apr. 4, 2006

(65) Prior Publication Data

US 2007/0261747 A1 Nov. 15, 2007

(51) Int. Cl.
*F16K 11/07* (2006.01)

(52) U.S. Cl. ............................ 137/625.69; 137/625.68

(58) Field of Classification Search ............ 137/625.35, 137/625.38, 625.65, 625.48, 625.17, 625.68, 137/625.69

See application file for complete search history.

(56) References Cited

U.S. PATENT DOCUMENTS

| | | | | | |
|---|---|---|---|---|---|
| 948,649 | A * | 2/1910 | Koelkebeck | ........... | 137/625.68 |
| 1,902,336 | A * | 3/1933 | Murray | ........................ | 251/231 |
| 2,203,939 | A * | 6/1940 | Barrett | ........................ | 137/596 |
| 2,736,170 | A * | 2/1956 | Huse | ........................... | 60/427 |
| 3,064,681 | A * | 11/1962 | Wilhelm et al. | ........ | 137/625.69 |
| 3,221,770 | A * | 12/1965 | Faisandier | ............. | 137/596.13 |
| 3,737,140 | A | 6/1973 | Toth | | |
| 4,011,891 | A | 3/1977 | Knutson et al. | | |
| 4,576,200 | A * | 3/1986 | Janecke et al. | ......... | 137/624.13 |
| 4,741,364 | A * | 5/1988 | Stoss et al. | ............. | 137/625.64 |
| 5,546,980 | A | 8/1996 | Kosarzecki | | |
| 5,553,895 | A | 9/1996 | Karl et al. | | |
| 5,570,910 | A | 11/1996 | Highlen | | |
| 6,182,697 | B1 | 2/2001 | Parker et al. | | |
| 6,494,494 | B2 | 12/2002 | Vogel et al. | | |
| 6,592,151 | B2 | 7/2003 | Densel et al. | | |
| 6,681,806 | B2 * | 1/2004 | Isobe | .................... | 137/625.65 |

* cited by examiner

*Primary Examiner*—John Rivell
*Assistant Examiner*—Craig M Schneider
(74) *Attorney, Agent, or Firm*—Sonu N. Weaver

(57) ABSTRACT

A manually actuated cartridge valve assembly (15) has a main body (31), a valve assembly (33), and an end assembly (35). Disposed within an internal cavity (107) of the end assembly (35) is a rotary member (109) that rotates about an axis (115) when a handle (29) is manually actuated. The axis (115) is substantially perpendicular to the axis (73) of the spool valve (49). The rotary member (109) has at least one axial end (117) that extends through the outer surface of the end assembly (35) and attaches to the handle (29). The movement of the handle (29) defines a plane of movement (147), which is selectively rotatable about the axis (73) to a desired orientation (149). A locking member (99) is selectively operably associated with the end assembly (35) to restrict rotation of the plane of movement (147).

18 Claims, 11 Drawing Sheets

SPOOL-TYPE MANUAL VALVE WITH POSITION-ADJUSTABLE LEVER

BACKGROUND OF THE DISCLOSURE

The present invention relates to cartridge valve assemblies, and more particularly, to such cartridge valve assemblies requiring manual actuation.

Many off-highway vehicles, including but not limited to boom lift trucks, have a hydraulic system which includes one or more ancillary or auxiliary hydraulic functions, such as raising or lowering a boom, or extending or retracting a boom, to control some portion of the vehicle. Many of these same vehicles require that the actuation of these hydraulic functions be manual. As a result of this manual actuation requirement, two types of manually actuated valve assemblies are typically used, a manually actuated sectional valve or a manually actuated rotary cartridge valve (hereinafter referred to as a "rotary valve").

A manually actuated sectional valve is shown in U.S. Pat. Nos. 3,434,390 and 4,011,891. This type of valve typically comprises a cast iron valve body and a spool valve. The spool valve, which extends through the entire length of the valve body, is manually actuated by a lever or handle which pivots about an axis that is rigidly attached to the valve body. The spool valve in the sectional valve interfaces directly with the spool bore defined by the valve body to control the flow of fluid to or from the auxiliary or ancillary hydraulic functions. Manual actuation of the lever results in axial (or linear) translation of the spool valve within the spool bore. While this design has proven to be very successful commercially and to work very well in many hydraulic applications, some applications require a design that is more customizable with regard to port locations. Because the valve body in the typical sectional valve is cast, the locations of the inlet and outlet ports, as well as any other ports, such as first and second actuator ports, are restricted to the port boss locations on the valve body casting. If a manufacturer of a hydraulic application requires different port locations for a particular application, a new valve body would need to be cast. However, a new casting can be cost prohibitive if the volumes of sectional valves required are not very large.

Rotary valves typically comprise a spool valve within a sleeve valve, with the sleeve valve being fixedly disposed in a valve housing. These valves also include a handle or knob which is rigidly connected to the spool valve. Actuation of these rotary valves is accomplished by rotating the handle about an axis which is coaxial to the axis of the spool valve. As is well known to those skilled in the art, rotation of the handle about the axis which is coaxial to the axis of the spool valve results in rotation of the spool valve about the axis of the spool valve. For hydraulic applications requiring greater customization with regard to port locations, many manufacturers of those applications will use rotary actuated cartridge valves. Unlike manually actuated sectional valves, the valve housing surrounding the rotary valve is typically machined from a block of aluminum or steel. Because of the relatively low manufacturing costs associated with machined valve housings, the customization issues that some manufacturers of hydraulic applications have with sectional valves are not a problem in the case of rotary valves.

However, although rotary valves have proven to be successful commercially and to work well in many applications, such valves have some disadvantages when used in certain commercial applications. One disadvantage associated with rotary valves concerns the flow rate through the valve. Because of the rotary actuation, rotary valves have a lower flow rate as compared to linearly actuated valves of a comparable size. The reason for this lower flow rate is that linear actuation of a valve allows for more fluid passage openings in the valve than rotary actuation allows.

In addition, a recent trend in commercial applications is to require that hydraulic components used on those applications, wherein the component includes a manually actuated valve assembly, be compact. Rotary valves, however, do not offer the most compact arrangement when multiple valves are used, because of the rotary actuation of the valve. When multiple rotary valves are arranged in a valve housing, adequate space must be provided between the valves to allow for manual actuation of each valve individually. Typically, the handles of valves of this type include a lever that extends radially from the rotational axis of the handles. As is well known to those skilled in the art, the lever provides a mechanical advantage in overcoming any pressure forces acting internally to the cartridge valve that make rotation difficult. The rotary valves must be spaced so that a lever on a given valve does not intrude upon the space required for full actuation of the lever of the adjacent valve. In other words, the valves must be spaced so that movement of the lever of a first valve does not result in that lever "bumping into" the lever of an adjacent valve, preventing the full range of motion of the lever of the first valve.

BRIEF SUMMARY OF THE INVENTION

Accordingly, it is an object of the present invention to provide a manually actuated cartridge valve which overcomes the above discussed disadvantages of the prior art.

It is a further object of the present invention to provide a cartridge valve assembly which is able to provide the necessary flow control functions in response to a manual input.

It is another object of the present invention to provide a cartridge valve assembly with a manual input, the position of which may be variously oriented about the cartridge valve assembly.

The above and other objects of the invention are accomplished by the provision of a cartridge valve assembly adapted to be disposed in a valve housing defining a cartridge bore, an inlet port, and a return port. The cartridge valve assembly includes a main body portion and a valve portion. The valve portion includes a sleeve valve, which is fixed within the cartridge bore, and a spool valve disposed in the sleeve valve for axial movement therein. A spring member operably associated with the spool valve is used to bias the spool valve within the sleeve valve toward a neutral axial position. A cap assembly includes a cap member, which defines an internal cavity, and a manual actuation member moveable from a neutral position, corresponding to the neutral axial position of the spool valve, to an operating position. The cap assembly is in sealed engagement with the main body of the cartridge valve assembly. The cap assembly is rotatable about an axis of the spool valve of the cartridge valve assembly. A locking means is selectively operably associated with the cap assembly to restrict rotation of the cap assembly relative to the main body.

The improved cartridge valve assembly is characterized by the cap assembly further including a rotary member disposed in the internal cavity of the cap member. An axis of the rotary member is substantially perpendicular to the axis of the spool valve. At least one axial end of the rotary member extends through the outer surface of the cap member. The rotary member is rotationally operable about the axis of the rotary member to axially displace the spool valve within the sleeve valve from the neutral axial position to an operating axial position. The movement of the manual actuation member defines a plane of movement which is parallel to the axis of the spool valve. The plane of movement of the manual actuation member is selectively rotatable about the axis of the spool valve to a desired orientation and is restricted from further rotation by the locking means.

DETAILED DESCRIPTION OF THE PREFERRED EMBODIMENT

Figure 1:
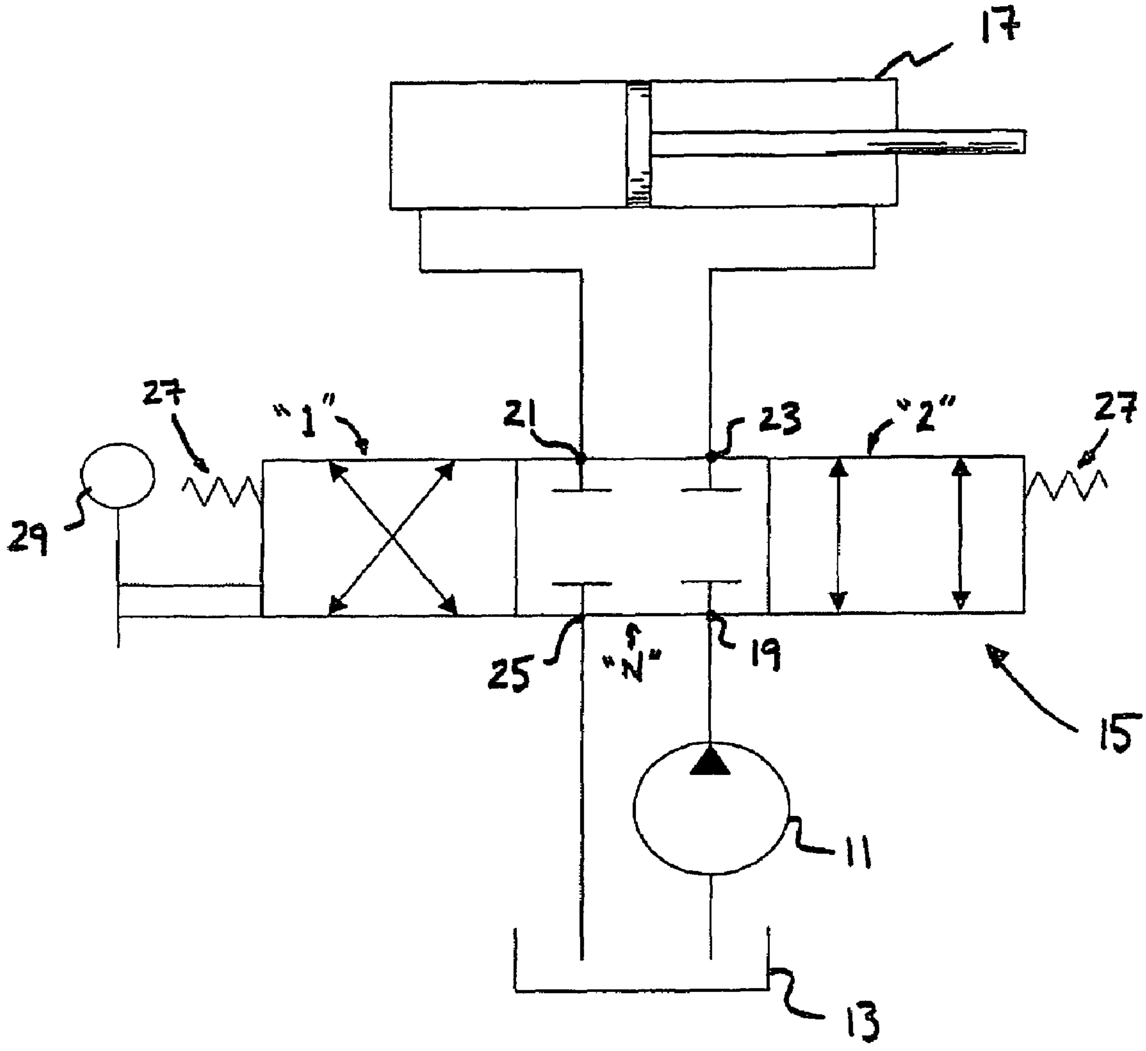
FIG. 1 is a simplified hydraulic schematic of a hydraulic system including the cartridge valve assembly made in accordance with the present invention.

Referring now to the drawings, which are not intended to limit the invention, FIG. 1 illustrates a hydraulic schematic for a hydraulic system and a cartridge valve assembly made in accordance with the teachings of the present invention. The system includes a fluid pump 11, shown herein as a fixed displacement pump, having its inlet connected to a system reservoir 13, a cartridge valve assembly, generally designated 15, and a pressure-operated device 17, shown herein as a cylinder.

Referring still to FIG. 1, the cartridge valve assembly 15 is shown as a 4-way, 3-position, closed-center valve. It should be clear to those skilled in the art, however, that the teachings of the present invention are not limited to 4-way, 3-position, closed-center valves. Those skilled in the art will understand that the teachings of the present invention could be employed on a variety of different valve configurations. Therefore, the teachings of the present invention will be described in regards to a 4-way, 3-position, closed-center valve, by way of example only.

The cartridge valve assembly 15 includes an inlet port 19, a first actuator port 21, a second actuator port 23, and a return port 25. The outlet of the fluid pump 11 is in fluid communication with the inlet port 19 of the cartridge valve assembly 15. The first 21 and second 23 actuator ports of the cartridge valve assembly 15 are in fluid communication with opposite ends of the pressure-operated device 17, while the return port 25 is in fluid communication with the system reservoir 13.

Referring still to FIG. 1, the cartridge valve assembly 15 is moveable from its neutral position, designated in FIG. 1 by reference numeral "N", to either a first operating position, designated in FIG. 1 by reference numeral "1", or to a second operating position, designated in FIG. 1 by reference numeral "2". As previously mentioned, the cartridge valve assembly 15 is being described as a 4-way, 3-position, close-center valve. As a closed-center valve, the cartridge valve assembly 15 blocks fluid communication between the inlet port 19, the first actuator port 21, the second actuator port 23, and the return port 25 when the cartridge valve assembly 15 is in the neutral position "N". A spring assembly, generally designated 27, biases the cartridge valve assembly 15 into the neutral position "N". Movement of the cartridge valve assembly 15 from the neutral position "N" to either the first "1" or second "2" operating position is accomplished by manual actuation of a handle member 29. When the handle member 29 is actuated such that the cartridge valve assembly 15 is moved to the first operating position "1", the inlet port 19 is in open fluid communication with the first actuator port 21 and the return port 25 is in open fluid communication with the second actuator port 23. When the handle member 29 is actuated such that the cartridge valve assembly 15 is moved to the second operating position "2", the inlet port 19 is in open fluid communication with the second actuator port 23 and the return port 25 is in open fluid communication with the first actuator port 21.

Figure 2:
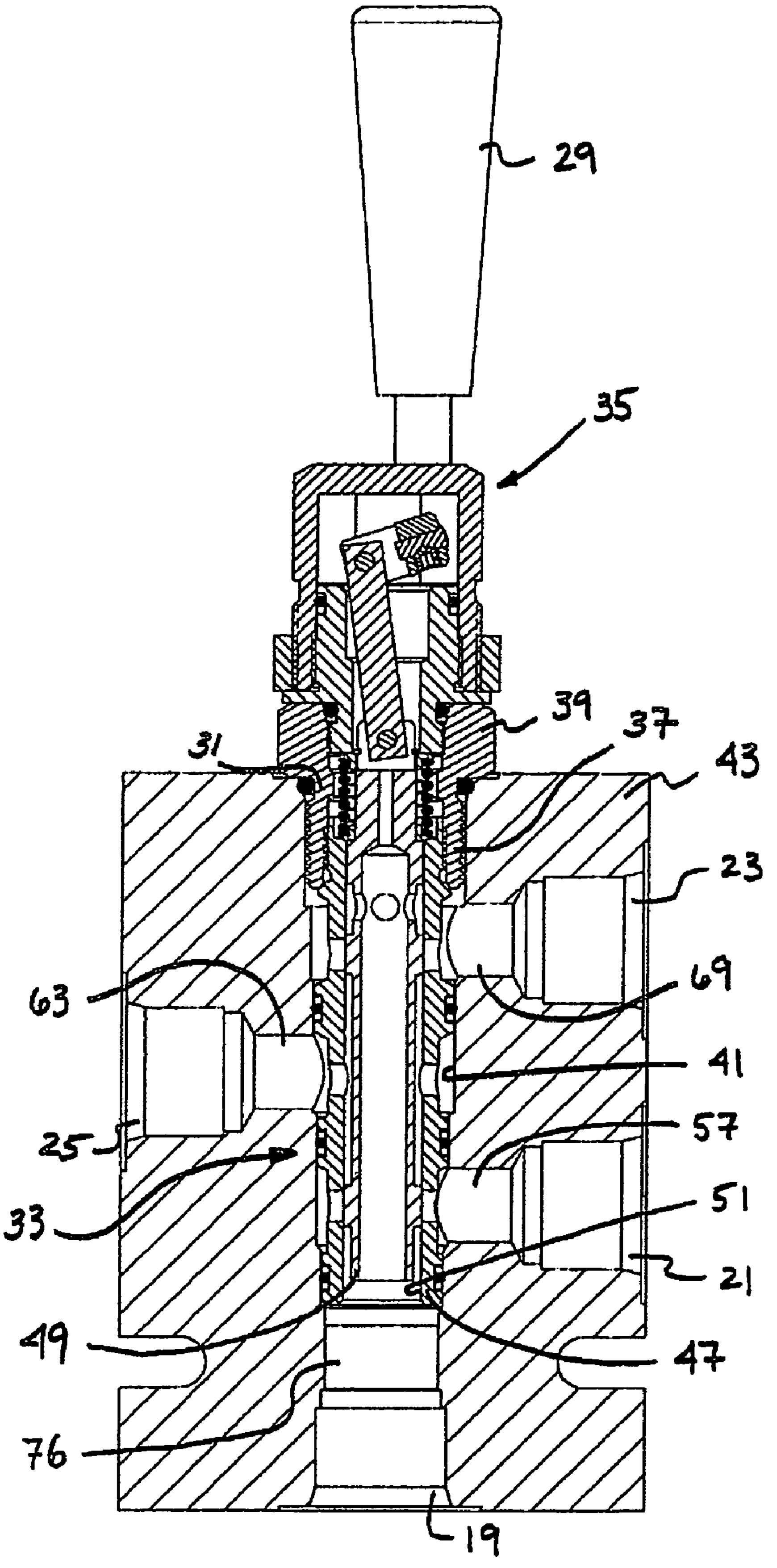
FIG. 2 is an axial cross-section of a valve housing, and disposed therein, the cartridge valve assembly of the present invention.

Referring now to FIG. 2, the cartridge valve assembly 15 includes a main body 31, a valve assembly, generally designated 33, and an end assembly, generally designated 35. The main body 31 includes a first axial end portion 37 and a second axial end portion 39. The first axial end portion 37 of the main body 31 is in sealing threaded engagement with a cartridge bore 41 in a valve housing 43. In the figures, the valve housing 43 is shown as a separate component of the hydraulic system. However, it should be understood by those skilled in the art that the valve housing 43 could be integrally formed with the housing of some other hydraulic component in the hydraulic system.

Figure 3:
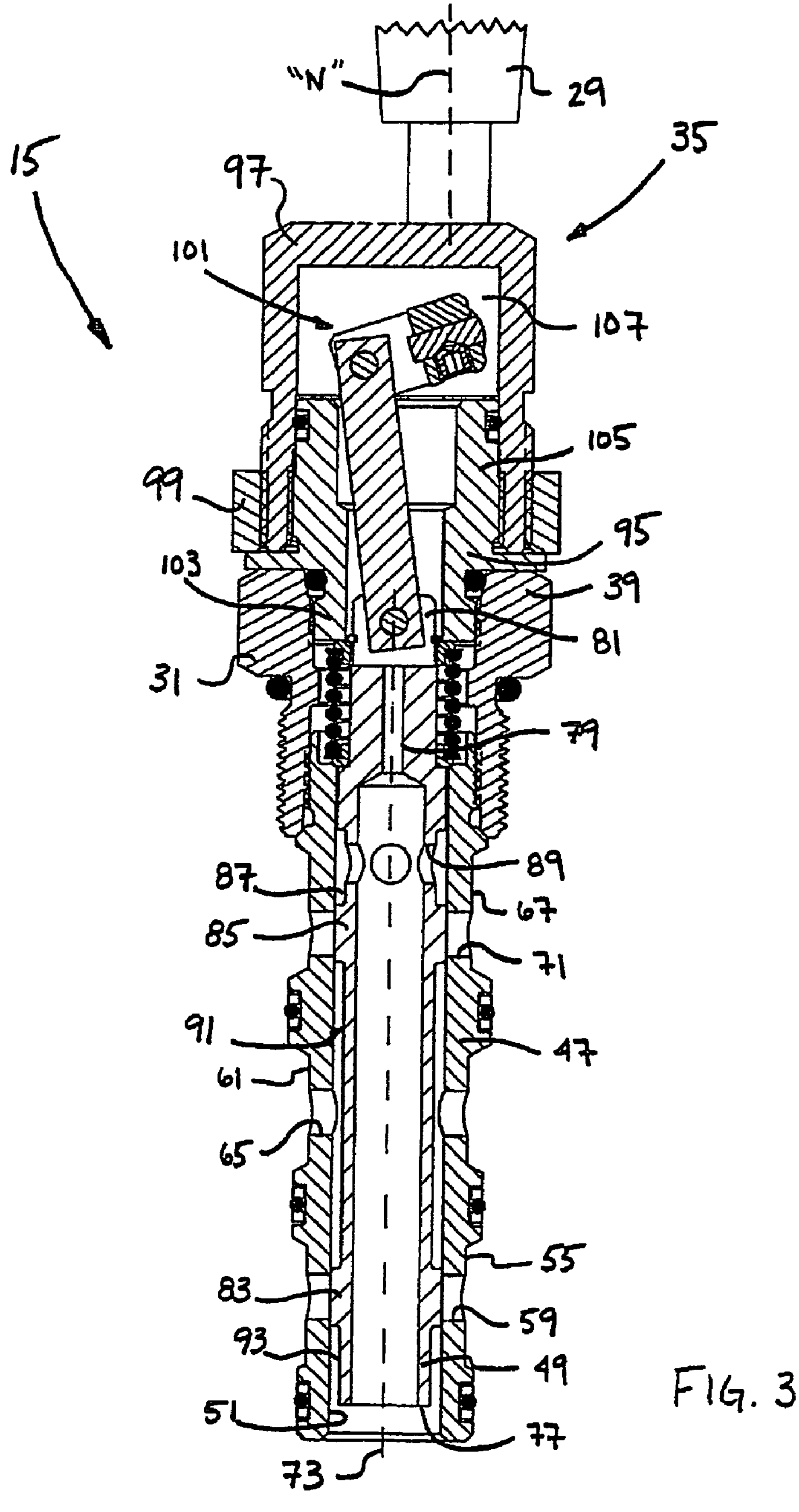
FIG. 3 is an enlarged, fragmentary, axial cross-section of the cartridge valve assembly of the present invention in the neutral position.

Referring now to FIGS. 2 and 3, the valve assembly 33, which is disposed in the cartridge bore 41 of the valve housing 43, includes a sleeve valve 47 and a spool valve 49, wherein the spool valve 49 is disposed in an internal bore 51 defined by the sleeve valve 47. The sleeve valve 47 is in threaded engagement with the first axial end portion 37 of the main body 31 of the cartridge valve assembly 15. As a result of the threaded engagement of the sleeve valve 47 with the main body 31, the sleeve valve 47 remains fixed in position in the cartridge bore 41 of the valve housing 43 while the main body 31 of the cartridge valve assembly 15 is fixed in position with the valve housing 43.

The sleeve valve 47 further defines a first annular groove 55 on the outer surface of the sleeve valve 47 which is axially aligned with a first actuator fluid passage 57 in the valve housing 43. The first actuator fluid passage 57 in the valve housing 43 allows open fluid communication between the cartridge bore 41 and the first actuator port 21. Disposed in the first annular groove 55 in the sleeve valve 47 is a plurality of first actuator passages 59 which provide fluid communication from the first annular groove 55 to the internal bore 51 of the sleeve valve 47. The sleeve valve 47 also defines a return annular groove 61 which is axially aligned with a return fluid passage 63 in the valve housing 43. The return fluid passage 63 in the valve housing 43 allows open fluid communication between the cartridge bore 41 and the return port 25 in the valve housing 43. Disposed in the return annular groove 61 in the sleeve valve 47 is a plurality of return passages 65 which provide fluid communication between the return annular groove 61 and the internal bore 51 of the sleeve valve 47. In addition, the sleeve valve 47 defines a second annular groove 67 which is axially aligned with a second actuator fluid passage 69 in the valve housing 43. The second actuator fluid passage 69 in the valve housing 43 allows open fluid communication between the cartridge bore 41 and the second actuator port 23. Disposed in the second annular groove 67 in the sleeve valve 47 is a plurality of second actuator passages 71 which provide fluid communication between the second annular groove 67 and the internal bore 51 of the sleeve valve 47.

Referring now primarily to FIG. 3, the spool valve 49 is disposed in the internal bore 51 of the sleeve valve 47. The spool valve 49 defines an axis 73, designated in FIG. 3 by a dashed line, which extends longitudinally through the center of the spool valve 49. During manual actuation of the handle member 29 of the cartridge valve assembly 15, the spool valve 49 is displaced axially along the axis 73 within the internal bore 51 of the sleeve valve 47 in a manner which will be described subsequently in greater detail. The spool valve 49 further defines an internal cavity 75 which is in open fluid communication with an inlet fluid passage 76 (shown in FIG. 2) in the valve housing 43. The inlet fluid passage 76 provides fluid communication between the inlet port 19 and the cartridge bore 41 in the valve housing 43. As shown in the figures, the internal cavity 75 has an opening on a first axial end 77 of the spool valve 49. The spool valve 49 further defines a fluid passage 79 which provides fluid communication from the internal cavity 75 through a second axial end 81 of the spool valve 49. This fluid communication through the fluid passage 79 allows the spool valve 49 to be axially pressure balanced so that axial movement of the spool valve 49 is uninhibited by pressurized fluid from the inlet port 19.

The exterior surface of the spool valve 49 defines a first annular land 83 disposed axially on the spool valve such that in the neutral position "N", the first annular land 83 substantially blocks fluid flow through the plurality of first actuator passages 59 in the sleeve valve 47 from entering the internal bore 51 of the sleeve valve 47. The exterior surface of the spool valve 49 further defines a second annular land 85 which is disposed axially on the spool valve 49 such that in the neutral position "N", the second annular land 85 substantially blocks fluid flow through the plurality of second actuator passages 71 in the sleeve valve 47 from entering the internal bore 51 of the sleeve valve 47. Adjacent the second annular land 85 is an actuator annular groove 87 in which are disposed a plurality of fluid ports 89 which communicate fluid from the internal cavity 75 to the actuator annular groove 87. Also defined by the spool valve 49 is a return annular groove 91 which is located axially between the first annular land 83 and the second annular land 85. The spool valve 49 further defines an inlet annular groove 93 which is in open fluid communication with the fluid passage 76.

Referring still to FIG. 3, the end assembly 35 includes an adaptor member 95, a cap member 97, a lock member 99, and an actuation assembly, generally designated 101, which will be described in greater detail subsequently. The adaptor member 95 includes a first axial end portion 103 and a second axial end portion 105. The first axial end portion 103 of the adaptor member 95 is in sealing threaded engagement with the second axial end portion 39 of the main body 31. The second axial end portion 105 of the adaptor member 95 is in sealing threaded engagement with the cap member 97. The end assembly 35 defines an internal cavity 107 with the first axial end portion 103 of the adaptor member 95 providing the opening to the internal cavity 107 and the cap member 97 providing the closed end of the internal cavity 107. Disposed within the internal cavity 107 is the actuation assembly 101.

Figure 4:
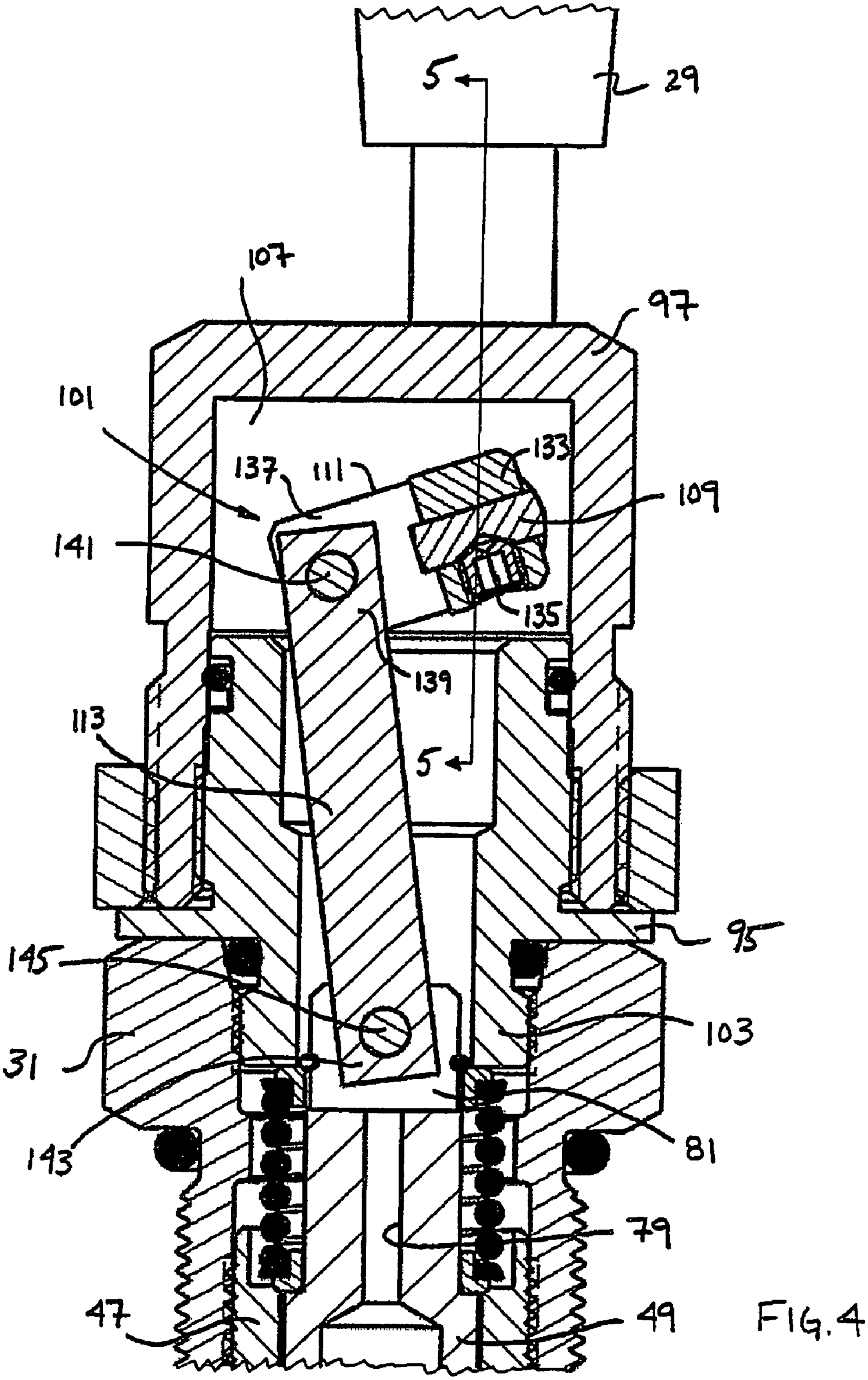
FIG. 4 is an enlarged, fragmentary view, similar to FIG. 3, of the actuation assembly of the cartridge valve assembly
Figure 5:
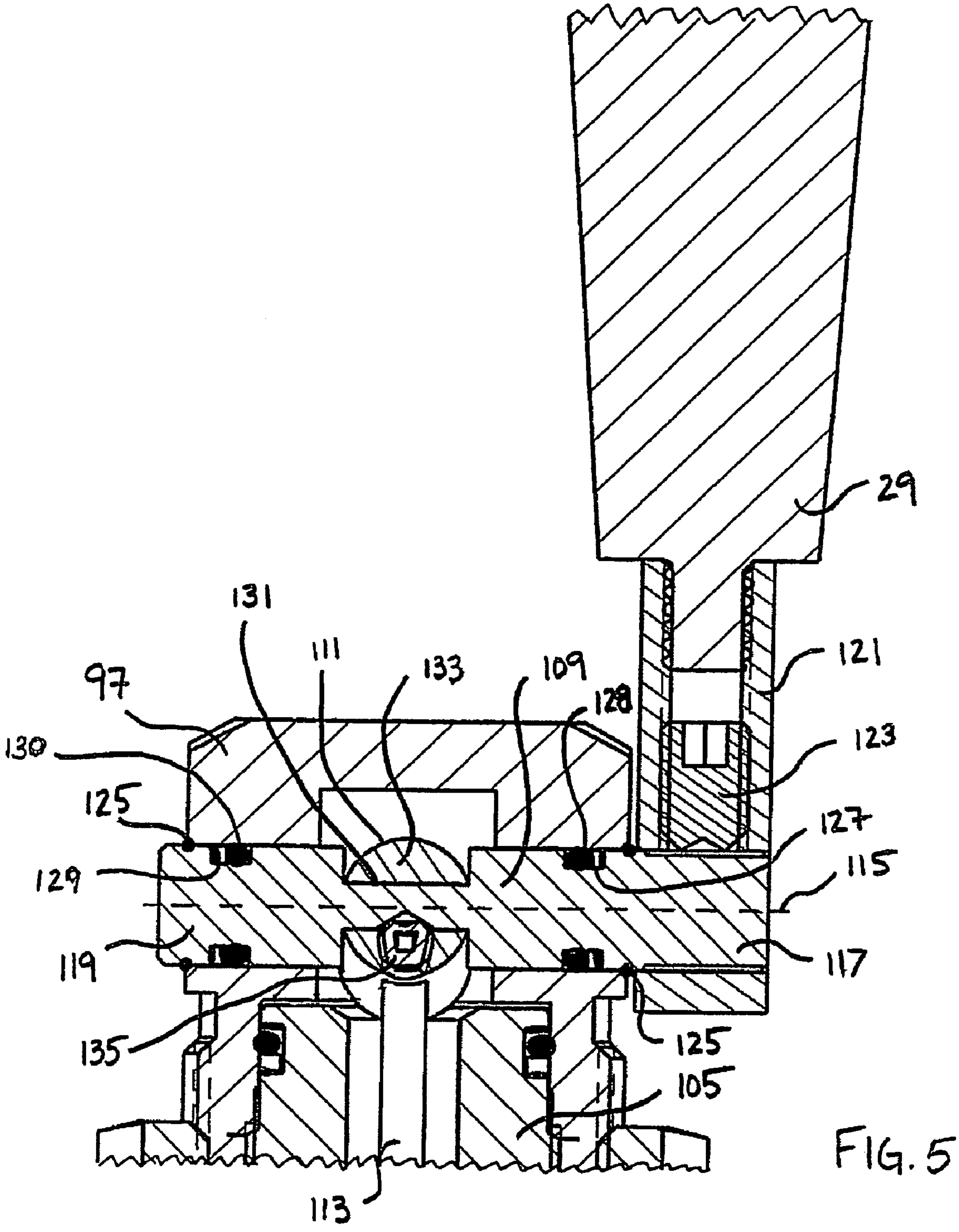
FIG. 5 is an enlarged, fragmentary, transverse cross-section of the actuation assembly of the cartridge valve assembly taken on line 5-5 in FIG. 4

Referring now to FIGS. 4 and 5, the actuation assembly 101 includes a rotary member 109, a swing member 111, and a connecting member 113. The rotary member 109, which is disposed in the internal cavity 107 of the end assembly 35, defines an axis 115 (shown only in FIG. 5 as a dashed line). The orientation of the axis 115 of the rotary member 109 is substantially perpendicular to the axis 73 of the spool valve 49. The rotary member 109, shown herein as being generally cylindrical in shape, further defines a first axial end portion 117 and a second axial end portion 119, and in the subject embodiment, it is preferred that the end portions 117 and 119 are substantially the same. The first axial end portion 117 extends through the outer surface of the cap member 97 and engages a handle rod 121. A retaining member 123, which is in threaded engagement with the handle rod 121, maintains the engagement of the rotary member 109 and the handle rod 121. The second axial end portion 119 of the rotary member 109 also extends through the outer surface of the cap member 97. A pair of retaining rings 125 maintains the axial position of the rotary member 109 relative to the end assembly 35. In the subject embodiment, the first axial end portion 117 defines a first seal groove 127 in which is disposed a first seal member 128. The second axial end portion 119 defines a second seal groove 129 in which is disposed a second seal member 130. The first and second seal members 128 and 130 prevent the egress of fluid from the internal cavity 107 to the exterior of the end assembly 35. It will be understood by those skilled in the art, however, that the first and second seal grooves 127 and 129, and the first and second seal members 128 and 130, could, as an alternative embodiment, be disposed in the end assembly 35 to prevent the egress of fluid from the internal cavity 107 to the exterior of the end assembly 35.

The rotary member 109 rotates about the axis 115 when the handle member 29 is manually actuated. With both the first and second axial end portions 117, 119, of the rotary member 109 being substantially equal in diameter and extending through the cap member 97, the rotary member 109 is substantially axially pressure balanced with regard to fluid pressure in the internal cavity 107 of the end assembly 35. This pressure balancing of the rotary member 109 allows the rotary member 109 to be rotated about the axis 115 easily regardless of the fluid pressure that is contained in the internal cavity 107 of the end assembly 35.

Referring now again to FIG. 5, the rotary member 109 further defines a notch 131 which is axially disposed between the first axial end portion 117 and the second axial end portion 119. The notch 131 is engaged with a first bifurcated end 133 of the swing member 111. A retention member 135 in threaded engagement with the first bifurcated end 133 of the swing member 111 maintains the engagement of the notch 131 and the first bifurcated end 133.

Figure 6:
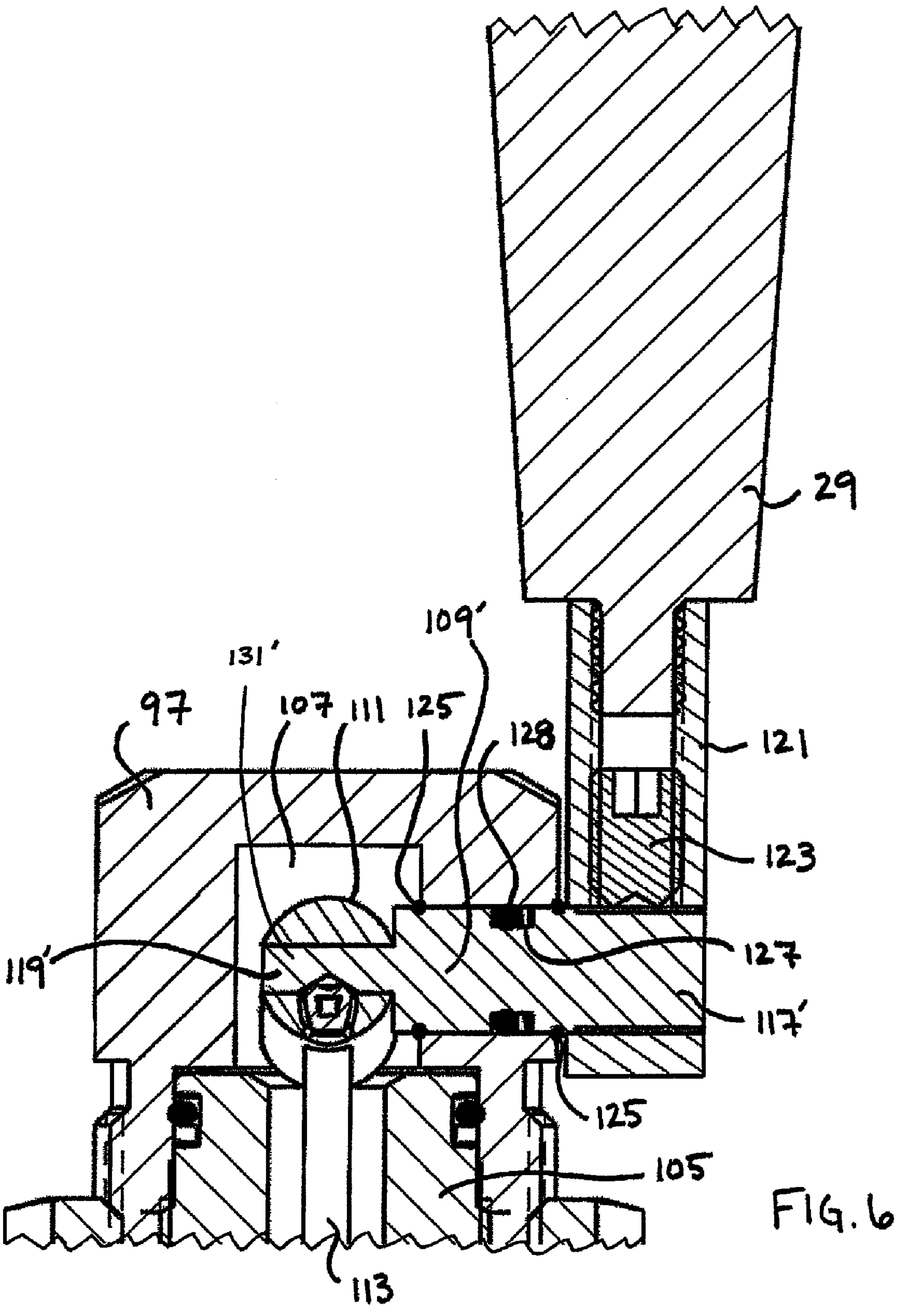
FIG. 6 is an enlarged, fragmentary, transverse cross-section showing an alternate embodiment of the actuation assembly of the cartridge valve assembly shown in FIG. 5.

Referring now to FIG. 6, an alternate embodiment of a rotary member 109'is shown. In this embodiment, only a first axial end portion 117'extends through the outer surface of the cap member 97. A second axial end portion 119'is disposed within the cavity 107 of the end assembly 35. In this embodiment, the second axial end portion 119'defines a notch 131'which is in engagement with the first bifurcated end 133 of the swing member 111. The retention member 135 is in threaded engagement with the first bifurcated end 133 and maintains the engagement of the notch 131'and the first bifurcated end 133. In order to prevent any axial movement of the rotary member 109', the retaining rings 125 are disposed on the first axial end portion 117'of the rotary member 109'.

Referring now again to FIG. 4, the swing member 111 includes a second bifurcated end 137, the bifurcation of which is oriented perpendicularly to the first bifurcated end 133. The second bifurcated end 137 of the swing member 111 is in engagement with a first end 139 of the connecting member 113 by means of a pin member 141. The fit between the pin member 141 and the second bifurcated end 137 of the swing member 111 is a tight fit, while the fit between the pin member 141 and the first end 139 of the connecting member 113 is a loose fit. The described fit arrangement of the pin member 141 allows for the connecting member 113 to rotate about the pin member 141.

The connecting member 113 further defines a second end 143 which is in engagement with the second axial end 81 of the spool valve 49. The second axial end 81 of the spool valve 49 is bifurcated with a hole (not shown) through the bifurcation. The second end 143 of the connecting member 113 is in pinned engagement with the second axial end 81 of the spool valve 49. The fit between a pin member 145 and the second axial end 81 of the spool valve 49 is a tight fit, while the fit between the pin member 145 and the second end 143 of the connecting member 113 is a loose fit. The described fit arrangement of the pin member 145 allows for the connecting member 113 to pivot about the pin member 145.

Figure 7:
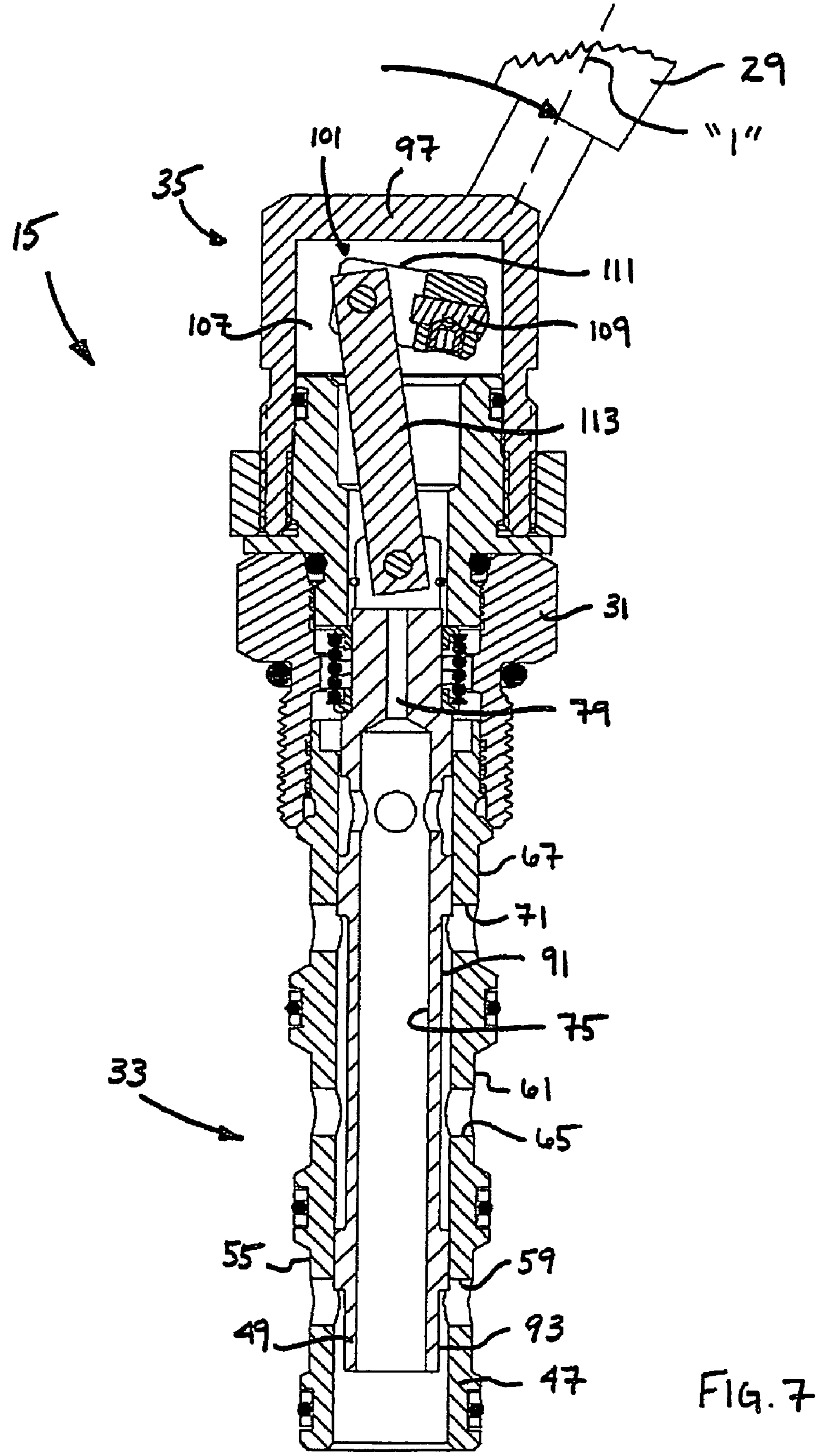
FIG. 7 is an enlarged, fragmentary, axial cross-section of the cartridge valve assembly of the present invention in the first operating position.

Referring now to FIG. 7, the cartridge valve assembly 15 is shown in the first operating position, corresponding to the position shown schematically as "1" in FIG. 1. For ease of description, the first operating position "1" of the cartridge valve assembly 15 and the orientation of individual components related thereto will be described in reference to the cartridge valve assembly 15 as pictured in FIG. 7. In the first operating position "1", the handle member 29 is actuated to the right causing the rotary member 109 to rotate about the axis 115 (shown only in FIG. 5) in the clockwise direction. The rotation of the rotary member 109 in the clockwise direction causes the swing member 111 to rotate about the axis 115 in the clockwise direction. The rotation of the swing member 111 about the axis 115 in the clockwise direction causes the second bifurcated end 137 of the swing member 111 to move upward in FIG. 7. As previously described, the second bifurcated end 137 of the swing member 111 is in pinned engagement with the first end 139 of the connecting member 113. Therefore, as the second bifurcated end 137 of the swing member 111 moves upward, the connecting member 113 also moves upward. As previously described, the second end 143 of the connecting member 113 is in pinned engagement with the second axial end 81 of the spool valve 49. Therefore, as the connecting member 113 moves upward, the spool valve 49 moves axially upward along the axis 73 of the spool valve 49.

In the first operating position "1", inlet fluid from the inlet port 19 flows into the interior cavity 75 of the spool valve 49. The fluid in the interior cavity 75 then flows through the fluid passage 79 in the spool valve 49 and into the internal cavity 107 of the end assembly 35. As previously described, this fluid communication through the fluid passage 79 of the spool valve 49 allows the spool valve 49 to be axially pressure balanced so that axial movement of the spool valve 49 is uninhibited by pressurized fluid from the inlet port 19.

Inlet fluid from the inlet port 19 also flows into the inlet annular groove 93 of the spool valve 49. The fluid then flows through the first actuator passages 59 in the sleeve valve 47 and into the first annular groove 55 in the sleeve valve 47. From the first annular groove 55, the fluid is communicated to the pressure-operated device 17 through the first actuator fluid passage 57 and the first actuator port 21 in the valve housing 43.

Return fluid from the pressure-operated device 17 enters the valve housing 43 through the second actuator port 23 and the second actuator fluid passage 69. The fluid then enters the second annular groove 67 in the sleeve valve 47. The fluid is communicated through the second actuator passages 71 in the sleeve valve 47 to the return annular groove 91 in the spool valve 49. From the return annular groove 91 in the spool valve 49, the fluid is communicated through return passages 65 in the sleeve valve 47 to the return port 25 in the valve housing 43 through the return annular groove 61 in the sleeve valve 47 and the return fluid passage 63 in the valve housing 43.

Figure 8:
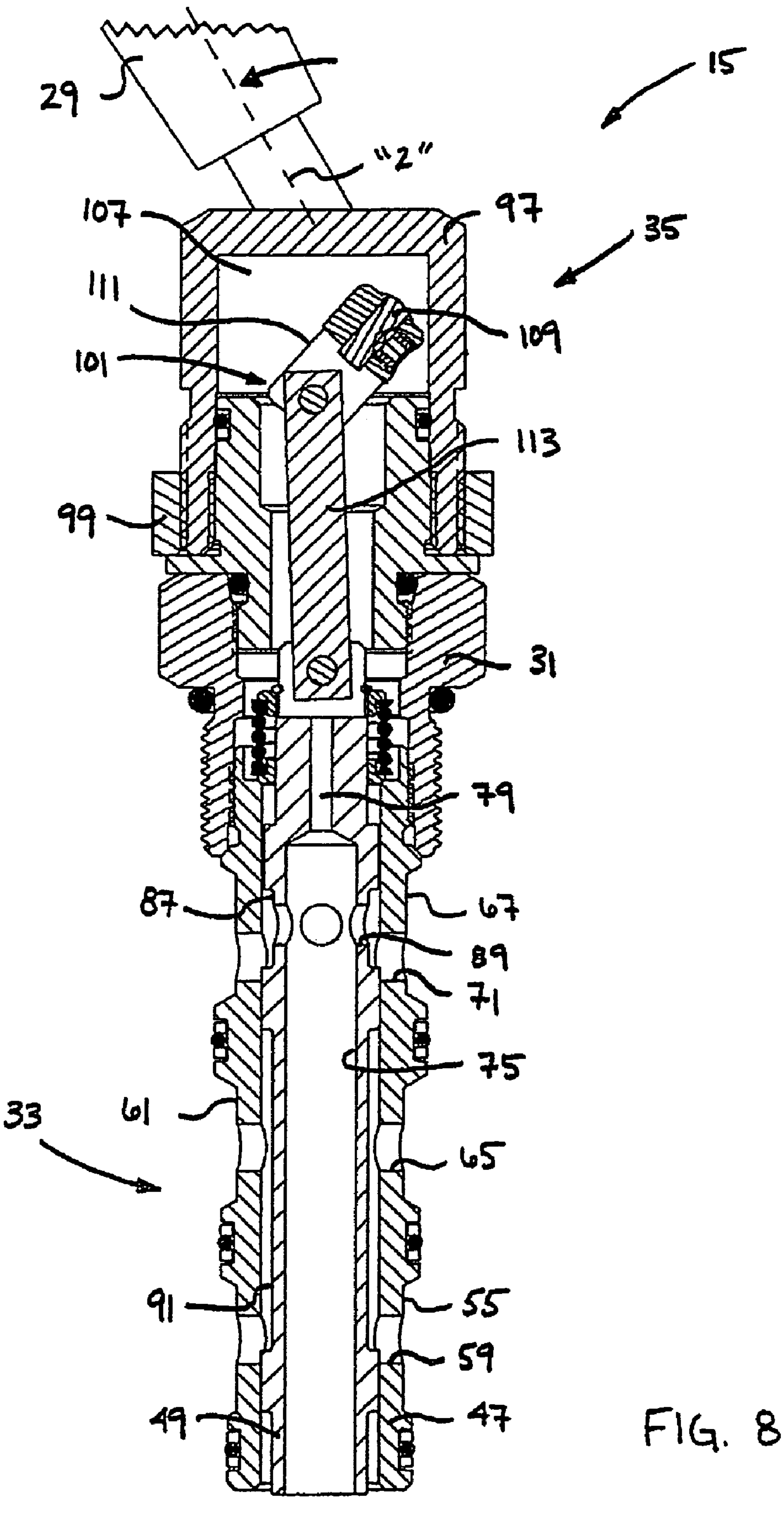
FIG. 8 is an enlarged, fragmentary, axial cross-section of the cartridge valve assembly of the present invention in the second operating position.

Referring now to FIG. 8, the cartridge valve assembly 15 is shown in the second operating position, corresponding to the position shown schematically as "2" in FIG. 1. For ease of description, the second operating position "2" of the cartridge valve assembly 15 and the orientation of individual components related thereto will be described in reference to the cartridge valve assembly 15 as pictured in FIG. 8. In the second operating position "2", the handle member 29 is actuated to the left causing the rotary member 109 to rotate about the axis 115 (shown only in FIG. 5) in the counterclockwise direction. The rotation of the rotary member 109 in the counterclockwise direction causes the swing member 111 to rotate about the axis 115 in the counterclockwise direction. The rotation of swing member 111 about the axis 115 in the counterclockwise direction causes the second bifurcated end 137 of the swing member 111 to move downward in FIG. 8. As previously described, the second bifurcated end 137 of the swing member 111 is in pinned engagement with the first end 139 of the connecting member 113. Therefore, as the second bifurcated end 137 of the swing member 111 moves downward, the connecting member 113 also moves downward. As previously described, the second end 143 of the connecting member 113 is in pinned engagement with the second axial end 81 of the spool valve 49. Therefore, as the connecting member 113 moves downward, the spool valve 49 moves axially downward along the axis 73 of the spool valve 49.

In the second operating position "2", inlet fluid from the inlet port 19 flows into the interior cavity 75 of the spool valve 49. The fluid in the interior cavity 75 then flows through the fluid passage 79 in the spool valve 49 and into the internal cavity 107 of the end assembly 35, thereby substantially pressure balancing the spool valve 49 in the same manner as described in connection with the first operating position "1". Fluid in the interior cavity 75 of the spool valve 49 also flows through the fluid ports 89 and into the actuator annular groove 87 in the spool valve 49. From the actuator annular groove 87 in the spool valve 49, the fluid flows through the second actuator passages 71 in the sleeve valve 47 and to the second actuator port 23 in the valve housing 43 through the second annular groove 67 in the sleeve valve 47 and the second actuator fluid passage 69 in the valve housing 43. From the second actuator port 23, the fluid is communicated to the pressure-operated device 17.

Return fluid from the pressure-operated device 17 enters the valve housing 43 through the first actuator port 21 and the first actuator fluid passage 57. The fluid then enters the first annular groove 55 in the sleeve valve 47. The fluid is communicated through the first actuator passages 59 in the sleeve valve 47 to the return annular groove 91 in the spool valve 49. From the return annular groove 91 in the spool valve 49, the fluid is communicated through return passages 65 in the sleeve valve 47 to the return port 25 in the valve housing 43 through the return annular groove 61 in the sleeve valve 47 and the return fluid passage 63 in the valve housing 43.

Figure 9:
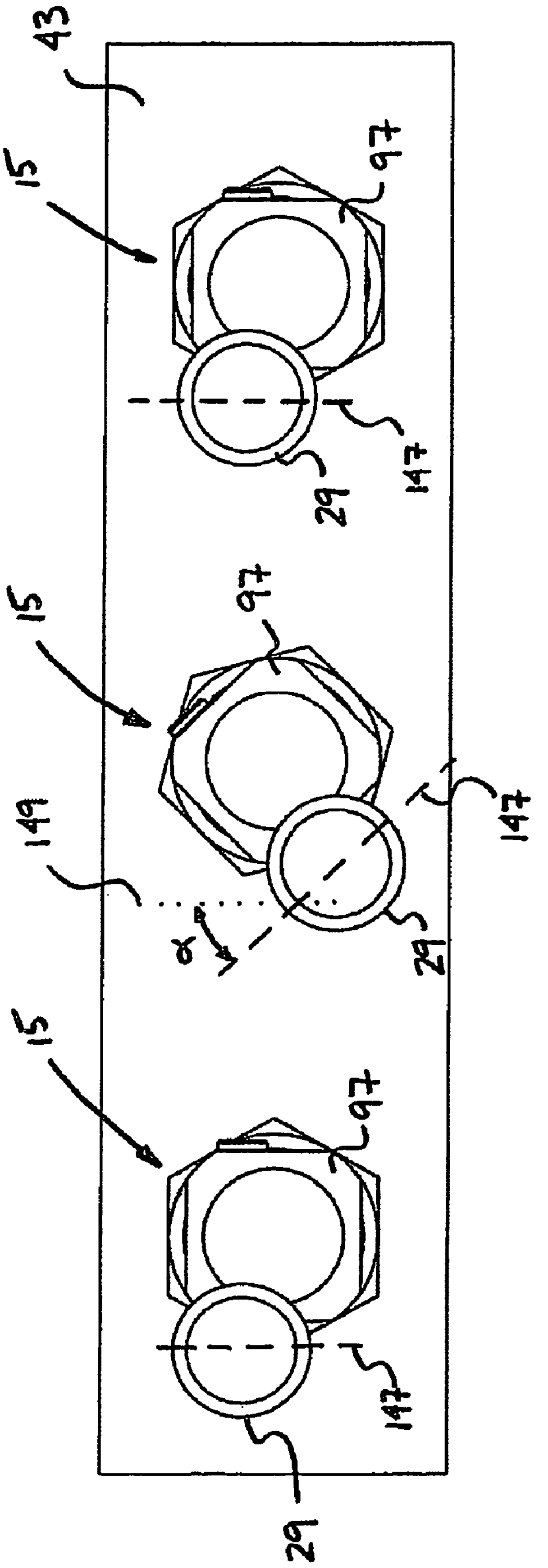
FIG. 9 is an exterior top view of multiple cartridge valve assemblies in a valve housing.

Referring now to FIG. 9 with reference made to elements introduced in FIG. 3, the movement of the handle member 29 from the neutral position "N" to either the first operating position "1" or the second operating position "2" defines a plane of movement 147 which is substantially parallel to the axis 73 of the spool valve 49. Since the cap member 97 is in threaded engagement with the adaptor member 95, the orientation of the plane of movement 147 of the handle member 29 is rotatable about the axis 73 of the spool valve 49. Therefore, after multiple cartridge valve assemblies 15 are mounted in a multi-valve valve housing 43, the plane of movement 147 corresponding to each handle member 29 of each cartridge valve assembly 15 may be oriented to a desired plane of orientation 149, shown in FIG. 9 as a dotted line, by rotating the cap member 97 with respect to the adaptor member 95. FIG. 9 illustrates a valve housing 43 capable of housing three cartridge valve assemblies 15. In FIG. 9, by way of example only, the plane of movement 147 of the handle member 29 of the cartridge valve assembly 15 located in the center of the three cartridge valve assemblies 15 is not in the desired plane of orientation 149. However, the plane of movement 147 can be rotated to the desired plane of orientation 149 by rotating the cap member 97 with respect to the adaptor member 95 by an angle $\alpha$. After the desired position of the plane of movement 147 is obtained, the lock member 99 of the end assembly 35 which is in threaded engagement with the cap member 97 is tightened to restrict any further rotation of the plane of movement 147 from the desired position. It is important to note that while the locking member 99 prevents further rotation of the plane of movement 147, it does not prevent actuation of the cartridge valve assembly 15 once the plane of movement 147 is co-planar with the desired plane of orientation 149. While in the present embodiment the lock member 99 is shown as a threaded lock nut, it should be understood by those skilled in the art that the present embodiment is not limited to the particular lock member 99 as shown.

Figure 10:
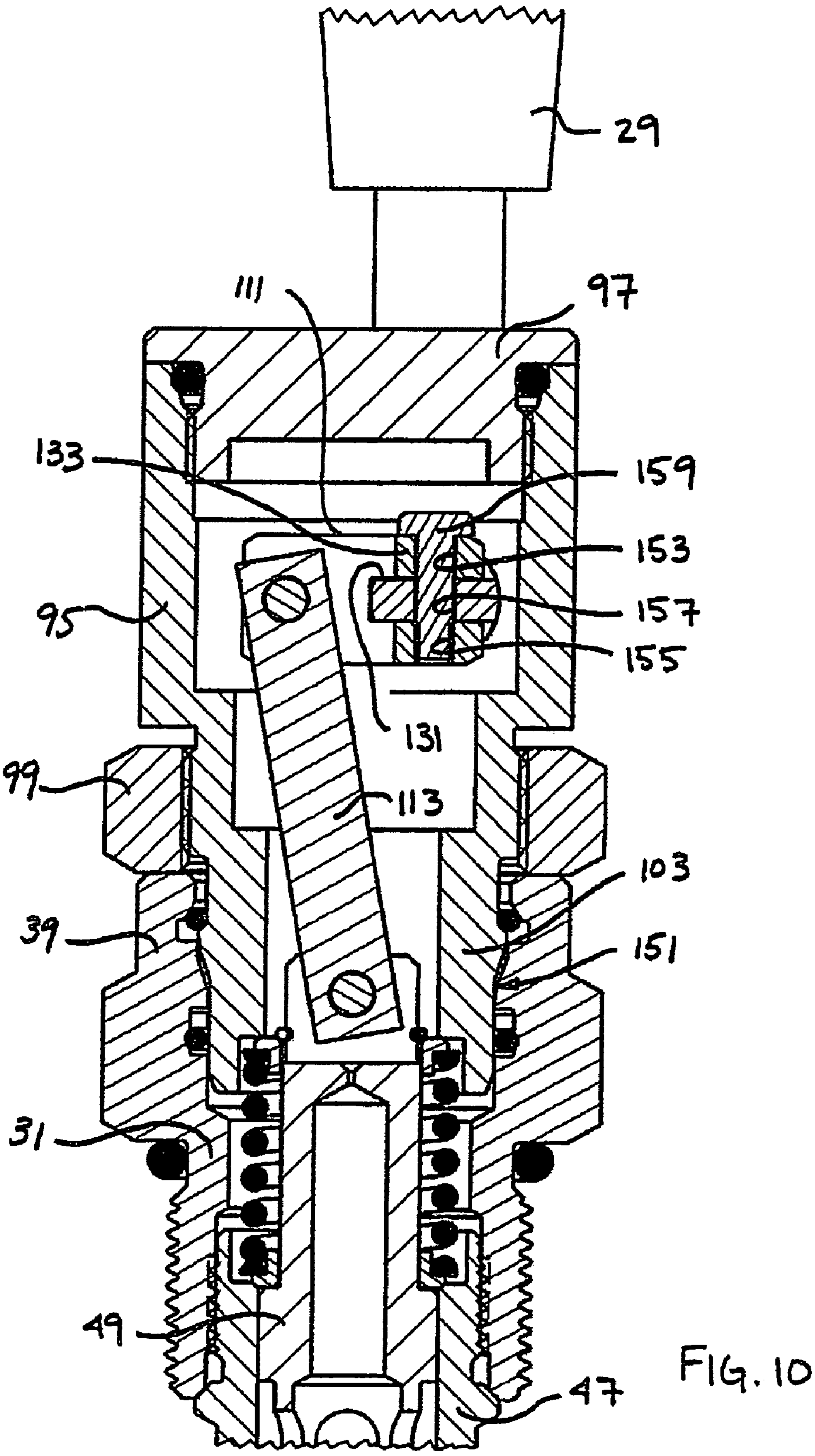
FIG. 10 is an enlarged, fragmentary, axial cross-section of an alternate embodiment of the cartridge valve assembly shown in FIG. 3.

Referring now to FIG. 10, an alternative embodiment of the cartridge valve assembly 15 is shown. In this embodiment, the first axial end portion 103 of the adaptor member 95 is in engagement with the second axial end portion 39 of the main body 31 through the use of a "snap-to-connect" connection arrangement 151. General types of snap-to-connect connectors are illustrated and described in U.S. Pat. Nos. 5,553,895, 5,570,910, 6,494,494, and 6,592,151, assigned to the assignee of the present invention and incorporated herein by reference, and therefore will not be described in great detail herein. However, as used herein, and in the appended claims, the term "snap-to-connect" will be used to mean not only those connections defined in the incorporated patents, but also any connections which are made by pushing a threadless male end into a threadless female end, the retention of which is accomplished by a snap ring arrangement. In this embodiment, the first and second axial end portions 117, 119, respectively, of the rotary member 109 extend through the outer surface of the adaptor member 95. In addition, an alternate engagement arrangement is shown for the rotary member 109 and the swing member 111. In this embodiment, the first bifurcated end 133 of the swing member 111 defines a thru hole 153 and a threaded hole 155. The notch 131 of the rotary member 109 also defines a thru hole 157. A pin member 159 passes through the thru hole 153 in the first bifurcated end 133 of the swing member 111 and the thru hole 157 in the notch 131 of the rotary member 109 and threads into the threaded hole 155 in the first bifurcated end 133 of the swing member 111. The lock member 99 serves the same function as previously described, however, in this embodiment, the lock member 99 is in threaded engagement with the adaptor member 95, rather than being in threaded engagement with the cap member 97 as in the embodiment of FIGS. 2 through 8.

Figure 11:
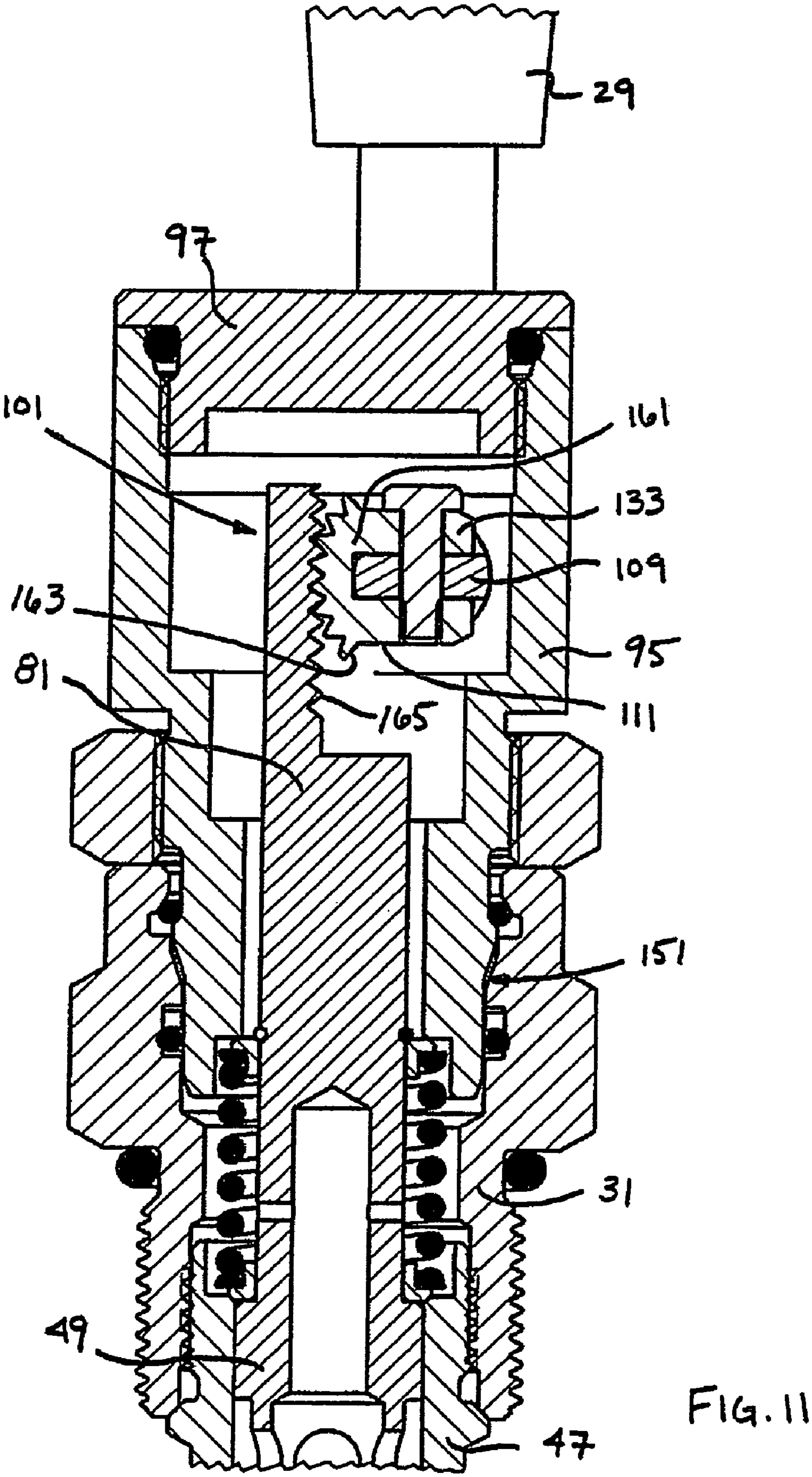
FIG. 11 is an enlarged, fragmentary, axial cross-section of an alternate embodiment of the cartridge valve assembly shown in FIG. 3.

Referring now to FIG. 11, an alternate embodiment of the actuation assembly 101 is shown. In this embodiment, the swing member 111 includes the first bifurcated end 133 which is in pinned engagement with the notch 131 of the rotary member 109, and a second end 161 which includes a set of external splines 163. The external splines 163 are in splined engagement with a set of external splines 165 disposed on the second axial end 81 of the spool valve 49. Therefore, when the handle member 29 is actuated, the rotary member 109 rotates about the axis 115, causing the swing member 111 to rotate about the axis 115, as well. The rotation of the swing member 111 about the axis 115 and the splined engagement of the external splines 163 of the swing member 111 and the external spines 165 of the spool valve 49 cause the spool valve 49 to be axially displaced along the axis 73.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A cartridge valve assembly adapted to be disposed in a valve housing defining a cartridge bore, an inlet port, and a return port; said cartridge valve assembly including a main body and a valve portion; said valve portion including a sleeve valve disposed in said cartridge bore, and a spool valve disposed within said sleeve valve for axial movement therein; a spring member operably associated with said spool valve to bias said spool valve within said sleeve valve toward a neutral axial position; an end assembly including a cap member and a manual actuation member moveable from a neutral position, corresponding to said neutral axial position of said spool valve to an operating position; said end assembly defining an internal cavity; said end assembly further including a rotary member disposed in said internal cavity; said end assembly being in sealing engagement with said main body of said cartridge valve assembly; said end assembly being rotatable about an axis of said spool valve of said cartridge valve assembly; characterized by:

(a) an axis of said rotary member being substantially perpendicular to said axis of said spool valve;

(b) at least one axial end of said rotary member extending through the outer surface of said end assembly;

(c) said rotary member being rotationally operable about said axis of said rotary member and including means operable to axially displace said spool valve within said sleeve valve from said neutral axial position to an operating axial position;

(d) said movement of said manual actuation member defines a plane of movement that is parallel to said axis of said spool valve;

(e) said plane of movement of said manual actuation member being selectively infinitely adjustable about said axis of said spool valve of said cartridge valve assembly; and (f) a locking means being selectively operably associated with said end assembly to restrict rotation of said plane of movement.

2. A cartridge valve assembly as claimed in claim 1, characterized by said first axial end of said rotary member extending through the outer surface of said cap member.

3. A cartridge valve assembly as claimed in claim 1, characterized by said locking means being in threaded engagement with said cap member.

4. A cartridge valve assembly as claimed in claim 1, characterized by said first and second axial ends of said rotary member extending through the outer surface of said end assembly.

5. A cartridge valve assembly as claimed in claim 4, characterized by said first and second axial ends of said rotary member extending through the outer surface of said cap member.

6. A cartridge valve assembly as claimed in claim 4, characterized by said rotary member being substantially axially pressure balanced.

7. A cartridge valve assembly as claimed in claim 1, characterized by an actuation assembly, which is disposed in said internal cavity of said end assembly, being operably associated with said rotary member and said spool valve.

8. A cartridge valve assembly as claimed in claim 7, characterized by said actuation assembly including a swing member defining a first axial end, being in engagement with said rotary member, and a second axial end being operably associated with said spool valve.

9. A cartridge valve assembly as claimed in claim 8 characterized by said second axial end of said swing member being in engagement with a connecting member, which is operably associated with said spool valve.

10. A cartridge valve assembly as claimed in claim 8, characterized by said second axial end of said swing member defining external splines which are operably associated with said spool valve.

11. A cartridge valve assembly adapted to be disposed in a valve housing defining a cartridge bore, an inlet port, and a return port; said cartridge valve assembly including a main body and a valve portion; said valve portion including a sleeve valve disposed in said cartridge bore, and a spool valve disposed within said sleeve valve for axial movement therein; a spring member operably associated with said spool valve to bias said spool valve within said sleeve valve toward a neutral axial position; an end assembly including a cap member and a manual actuation member moveable from a neutral position, corresponding to said neutral axial position of said spool valve to an operating position; said end assembly defining an internal cavity; said end assembly further including a rotary member disposed in said internal cavity; said end assembly being in sealing engagement with said main body of said cartridge valve assembly; said end assembly being rotatable about an axis of said spool valve of said cartridge valve assembly; characterized by:

(a) an axis of said rotary member being substantially perpendicular to said axis of said spool valve;

(b) at least one axial end of said rotary member extending through the outer surface of said end assembly;

(c) said rotary member being rotationally operable about said axis of said rotary member and including means operable to axially displace said spool valve within said sleeve valve from said neutral axial position to an operating axial position;

(d) said movement of said manual actuation member defines a plane of movement that is parallel to said axis of said spool valve;

(e) said plane of movement of said manual actuation member being selectively rotatable about said axis of said spool valve of said cartridge valve assembly to a desired orientation; and (f) a locking means being selectively operably associated with said end assembly to restrict rotation of said plane of movement, said locking means being in threaded engagement with an adaptor member, a first axial end of which is disposed in sealing engagement with said main body.

12. A cartridge valve assembly as claimed in claim 11, characterized by said engagement of said first axial end of said adaptor member and said main body being of a snap-to-connect type.

13. A cartridge valve assembly comprising:

a main body having a first axial end portion and an oppositely disposed second axial end portion;

a valve assembly including a sleeve valve defining an internal bore and a spool valve disposed in the internal bore of the sleeve valve for selective axial movement therein, wherein the sleeve valve is engaged with the first axial end portion of the main body;

an end assembly engaged with the second axial end of the main body, the end assembly including:

a cap member defining an internal cavity and including external threads;

an actuation assembly disposed in the internal cavity and adapted to selectively axially displace the spool valve relative to the sleeve valve, the actuation assembly including a rotary member defining an axis that is substantially perpendicular to an axis of the spool valve, wherein the rotary member has at least one end that extends through an outer surface of the cap member;

a handle engaged with the rotary member, the handle being selectively moveable between a first position and a second position, the movement of the handle between the first position and the second position defining a plane of movement that is generally parallel to an axis of the spool valve, wherein the handle is selectively rotatable about the axis of the spool valve; and a lock nut in threaded engagement with the external threads of the cap member, the lock nut being selectively operable to restrict rotation of the handle about the axis of the spool valve.

14. A cartridge valve assembly as claimed in claim 13, wherein the actuation assembly includes a swing member defining a first axial end that is in engagement with the rotary member and a second axial end that is operably associated with said spool valve.

15. A cartridge valve assembly as claimed in claim 14, wherein the second axial end of the swing member being in engagement with a connecting member that is engaged with the spool valve.

16. A cartridge valve assembly as claimed in claim 13, wherein an adapter member engages the end assembly to the second axial end of the main body.

17. A cartridge valve assembly as claimed in claim 16, wherein a first axial end portion of the adapter member is in threaded engagement with the second axial end of the main body and a second axial end portion of the adapter member is in threaded engagement with internal threads of the cap member.

18. A cartridge valve assembly as claimed in claim 16, wherein a first axial end portion of the adapter member is in snap-to-connect engagement with the second axial end of the main body.

* * * * *